Nov. 13, 1962 P. A. LINCOLN 3,063,665

DRILL MOUNTING

Filed Sept. 30, 1960 2 Sheets-Sheet 1

INVENTOR
PAUL A. LINCOLN
BY
HIS ATTORNEY

Nov. 13, 1962    P. A. LINCOLN    3,063,665
DRILL MOUNTING

Filed Sept. 30, 1960    2 Sheets-Sheet 2

INVENTOR
PAUL A. LINCOLN
BY
HIS ATTORNEY

United States Patent Office 3,063,665
Patented Nov. 13, 1962

3,063,665
DRILL MOUNTING
Paul A. Lincoln, Bloomsbury, N.J., assignor to Ingersoll-Rand Company, New York, N.Y., a corporation of New Jersey
Filed Sept. 30, 1960, Ser. No. 59,657
7 Claims. (Cl. 248—20)

This invention relates to guide mountings for rock drills and particularly to that type of mounting provided with a feed screw for causing said rock drill to travel lengthwise of the mounting.

Guide mountings for rock drills of the type to which this invention relates are often troubled with vibration of the feed screw particularly when the guide mounting is relatively long. Vibration of the drill which threadingly engages the feed screw causes excessive wear not only at the threads but at the end bearings, if the latter are not cushioned. Also the excessive ratio of length to diameter of the feed screw contributes to whip due to its flexibility.

It is an object of this invention to provide an improved construction of guide mounting to reduce the whip and vibrations in the feed screw.

A further object of the invention is to cushion the end bearings of the feed screw to reduce the shock of vibrations between the drill and the feed screw, and furthermore to provide a construction which will combine with such cushioning means for reducing the shock as the rock drill reaches the end of its travel.

Figure 1:
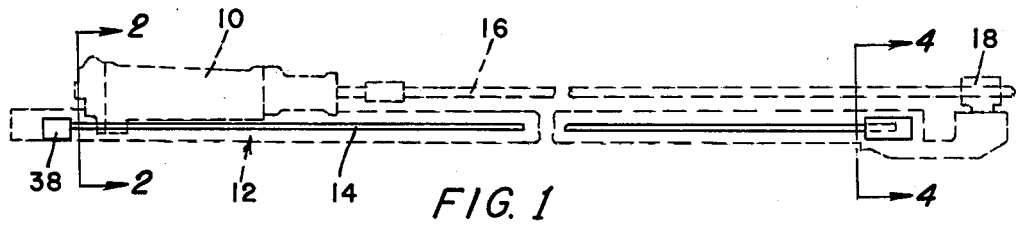
Figure 2:
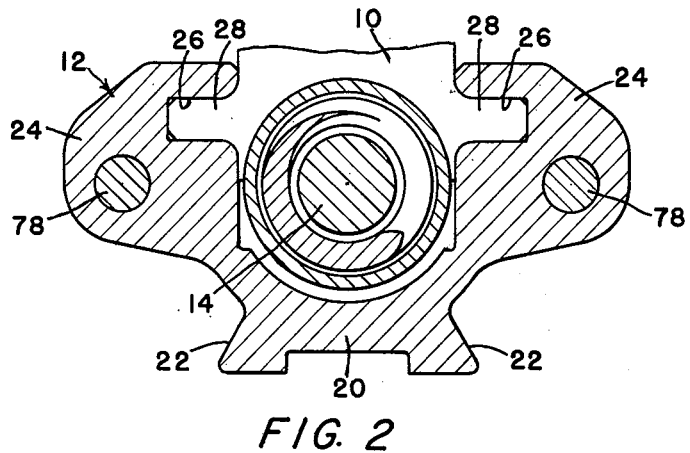
Figure 3:
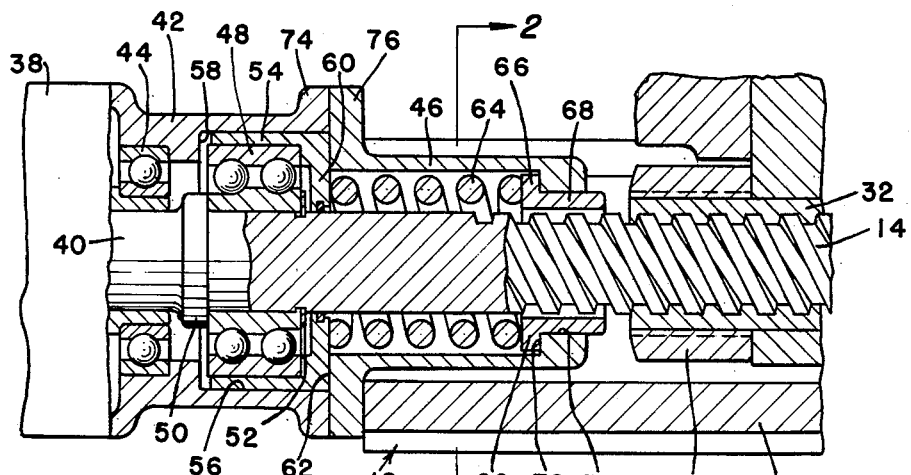
Figure 5:
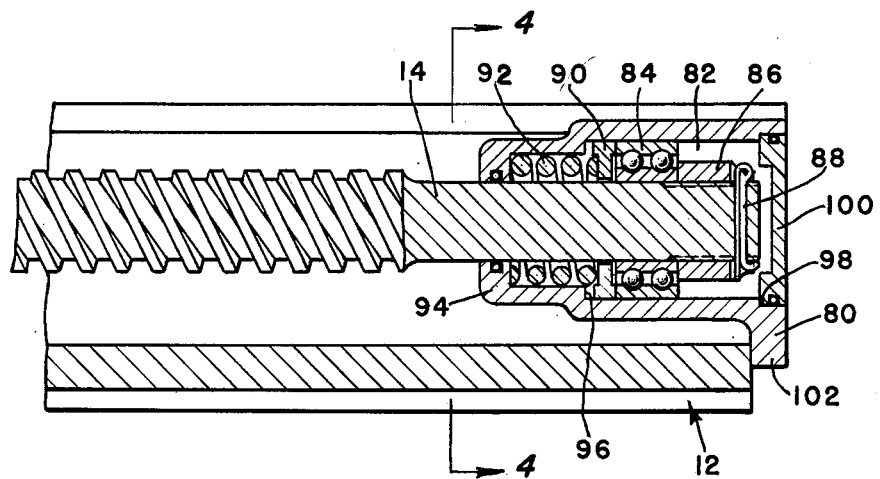
Figure 4:
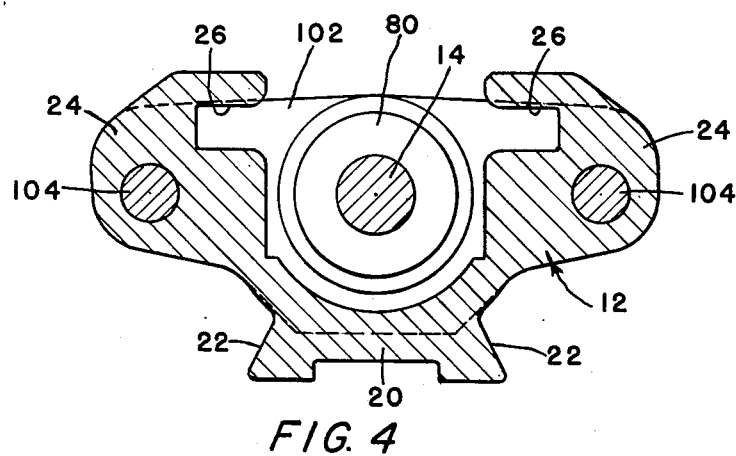

Other objects and advantages of the construction will be in part obvious and in part pointed out in the following specification taken with the drawings showing an improved and preferred embodiment of the invention and in which FIGURE 1 is a side view partly diagrammatic showing a general layout of a drill and its mounting, FIG. 2 is a transverse section of the mounting taken at the line 2—2 looking in the direction of the arrows, FIG. 3 is a longitudinal section of the rear portion of the drill mounting, FIG. 4 is a transverse sectional view of the mounting at the line 4—4 looking in the direction of the arrows, and FIG. 5 is a longitudinal central section of the front end of the guide shell and the feed screw and its bearing assembly.

Referring to the drawing the general arrangement of a percussive type rock drill and its mounting is shown in FIG. 1 in which the drill 10 which may be of the type commonly known as a drifter is slidably mounted on a guide shell 12 and is moved longitudinally forward and backward by a feed screw 14 mounted on shell 12. Drill 10 is provided with a drill steel 16 projecting forwardly suitably guided by any suitable type of centralizer 18 mounted at the front end of shell 12.

As indicated in FIG. 2 guide shell 12 is of the type commonly used on wagon drills and similar mountings and has a base portion 20 provided with diverging side walls 22 for engagement with a suitable clamp (not shown). The side portions 24 extend upwardly and are each provided with a groove 26 extending lengthwise of shell 12 for engagement with laterally extending arms 28 of drill 10. Between side portions 24 is provided feed screw 14 threaded to engage the feed nut 32 in a downwardly extending boss of drill 10 and held thereon by a nut 36. At the rear end of feed screw 14 is provided a suitable motor 38 having a motor shaft 40 formed integrally with feed screw 14. The base 42 of motor 38 extends beyond shaft bearing 44 of shaft 40 and with a cup-shaped member 46 provides a chamber to house a thrust bearing 48 for feed screw 14.

Bearing 48 is of the anti-friction type, preferably, as shown and is mounted on feed screw 14 to abut a flange 50 formed on the feed screw and held in that position by a keeper 52 on feed screw 14. Bearing 48 fits within a sleeve 54 slidable in bore 56 of base 42, such sliding movement being limited by shoulder 58 at the end of bore 56. Sleeve 54 is provided with inwardly extending flange 60 adapted to abut the rearward face 62 of cup-shaped member 46 and thus forward movement of bearing 48 is limited. A powerful coil spring 64 is provided within cup-shaped member 46 bearing against flange 60 at one end and at the other end against the flange 66 of a sleeve 68 slidable in a bore 70 at the front end of cup-shaped member 46 seating on shoulder 72 at the inner end of bore 70. Sleeve 68 is adapted to project outwardly from the enclosure within member 46 and into the path of drill 10 at the projecting nut 36 as drill 10 is retracted. By compression of spring 64 shocks of contact between nut 36 and sleeve 68 are cushioned.

Base 42 and cup-shaped member 46 are provided with abutting flanges 74 and 76 respectively by which they can be attached to the rearward end of guide shell 12 with suitable cap screws 78.

At the front end of feed screw 14 a somewhat similar bearing construction is provided which includes a bearing housing 80 hollow to form a chamber 82 to contain the anti-friction thrust bearing 84 which as shown is slidable therein and held on the end of feed screw 14 by a nut 86 held against rotation by a cotter pin 88. Adjacent the end of bearing 84 on the side opposite nut 86 is a thrust collar 90 forming a bearing for the heavy coil spring 92 encircling the feed screw 14 and pressing against the inturned flange 94 at the end of housing 80. Endwise motion of feed screw 14 is limited in a rearward direction by the small space provided between thrust collar 90 and an internal shoulder 96 formed within housing 80. Access to the interior of housing 80 is provided by an aperture 98 at the forward end thereof and adapted to be closed by a suitable cap or cover 100. Housing 80 is provided with a flanged end 102 conforming to the shell 12 in forms of means of attachment thereto as by means of cap screw 104.

It will be understood that coil springs 64 and 92 are preferably very powerful springs which are adapted to be compressed in the spaces within their respective containing elements, cup-shaped member 46 and housing 80 so that feed screw 14 will be under considerable tension. It will be understood also that the compression thus provided will be sufficient to prevent any very considerable banging of the thrust bearing against the limiting faces 58 and 96 during the operation of drill 10. Furthermore compression of spring 64 will be such that when nut 36 will strike against the sleeve 68 the force required to compress spring 64 will be sufficient to very considerably slow down rotation of the motor 38. On the other hand the endwise movement of feed screw 14 is sufficient to prevent any considerable jar on thrust bearings 48 and 84 and to maintain good contact at the threads of feed screw 14 and feed nut 32. Very important is the tensioning of feed screw 14 by springs 64 and 92 to practically eliminate whip due to the great length of feed screw 14.

It will be noted that regardless of the direction of motion of drill 10 on guide 12, feed screw 14 is in tension which in itself avoids whip and tends to avoid vibration such as will invariably occur when a long feed screw is under compression.

Thus, by the above construction are accomplished, among others, the objects hereinbefore referred to.

I claim:

1. Guide mounting for rock drills, comprising a guide shell to slidingly support said rock drill for longitudinal motion thereon, a feed screw extending longitudinally of said shell capable of limited longitudinal movement relative thereto, said screw threading engaging said drill, a bearing at each end of said feed screw mounted on said shell, and resilient means interposed between the shell and the feed screw exerting opposing forces on the screw to oppose the limited movement and to maintain the screw in tension to reduce vibration thereof that is caused by drill operation.

2. Guide mounting for rock drills, comprising a guide shell to slidingly support said rock drill for longitudinal motion theron, a feed screw extending longitudinally of said shell capable of limited longitudinal movement relative thereto, said screw threadingly engaging said drill, a bearing at each end of said feed screw mounted on said shell, and resilient means at each end of the feed screw disposed between the screw and the shell, one exerting a longitudinal force on the screw to oppose the limited movement and the other exerting a force opposing the longitudinal force to maintain said feed screw in tension to reduce vibration thereof that is caused by drill operation.

3. Guide mounting for rock drills, comprising a guide shell to slidingly support said rock drill for longitudinal motion thereon and having an enclosure at each end, a feed screw extending longitudinally of said shell capable of longitudinal movement relative thereto, said screw threadingly engaging said drill, a thrust bearing at each end of said feed screw each bearing being mounted on said guide, and resilient means in said enclosure interposed between said bearings and said enclosures one exerting a longitudinal force on the screw to oppose the limited movement and the other exerting a force opposing the longitudinal force to tension said feed screw to reduce vibration thereof that is caused by drill operation.

4. Guide mounting for rock drills, comprising a guide shell to slidingly support said rock drill for longitudinal motion thereon, a feed screw extending longitudinally of said shell capable of limited longitudinal movement relative thereto, said screw threadingly engaging said drill, a thrust bearing at each end of said feed screw mounted thereon, an enclosure for each said bearing fixedly mounted on said guide, and spring means in said enclosures interposed between said bearings and said enclosures one exerting a longitudinal force on the screw to oppose the limited movement and the other exerting a force opposing the longitudinal force, to tension said feed screw to reduce vibration thereof that is caused by drill operation.

5. Guide mounting for rock drills, comprising a guide shell to slidingly support said rock drill for longitudinal motion thereon and having an enclosure at each end, a feed screw extending longitudinally of said shell capable of limited longitudinal movement relative thereto, said screw threadingly engaging said drill, a thrust bearing at each end of said feed screw each bearing being mounted in one of the enclosures, resilient means in each of said enclosures interposed between said bearings and said enclosures one exerting a longitudinal force on the screw to oppose the limited movement and the other exerting a force opposing the longitudinal force to tension said feed screw to reduce vibration thereof that is caused by drill operation, and a movable abutment member interposed between one of said springs and its enclosure and projecting therefrom in the path of said drill to cushion the shock of contact therewith.

6. Guide mounting for rock drills, comprising a guide shell to slidingly support said rock drill for longitudinal motion thereon, a feed screw extending longitudinally of said shell capable of limited longitudinal movement relative thereto, said screw threadingly engaging said drill, means forming a chamber at each end of said shell, each to receive an end of said feed screw, a thrust bearing on each end of said screw contained in said chambers and having limited motion lengthwise therein, and springs in said chambers in compression against said bearings one exerting a longitudinal force on the screw to oppose the limited movement and the other exerting a force opposing the longitudinal force, to tension said feed screw to reduce vibration thereof that is caused by drill operation.

7. Guide mounting for rock drills, comprising a guide shell to slidingly support said rock drill for longitudinal motion thereon, a feed screw extending longitudinally of said shell and threadingly engaging said drill, means forming a chamber at each end of said shell, each to receive an end of said feed screw, a thrust bearing on each end of said screw contained in said chambers and having limited motion lengthwise therein, spring in said chambers in compression against said bearings one exerting a longitudinal force on the screw to oppose the limited movement and the other exerting a force opposing the longitudinal force, to tension said feed screw to reduce vibration thereof that is caused by drill operation, and a movable abutment member interposed between one of said springs and its enclosure and projecting therefrom in the path of said drill to cushion the shock of contact therewith.

References Cited in the file of this patent

UNITED STATES PATENTS

| | | |
|---|---|---|
| 1,751,302 | Bayliff et al. | Mar. 18, 1930 |
| 2,341,472 | O'Farrell | Feb. 8, 1944 |
| 2,581,805 | Maxson | Jan. 8, 1952 |
| 2,837,316 | Lear | June 3, 1958 |

FOREIGN PATENTS

| | | |
|---|---|---|
| 523,147 | Canada | Mar. 27, 1956 |